The invention described herein may be manufactured and used by or for the Government of the United States of America for governmental purposes without the payment of any royalties thereon or therefor.

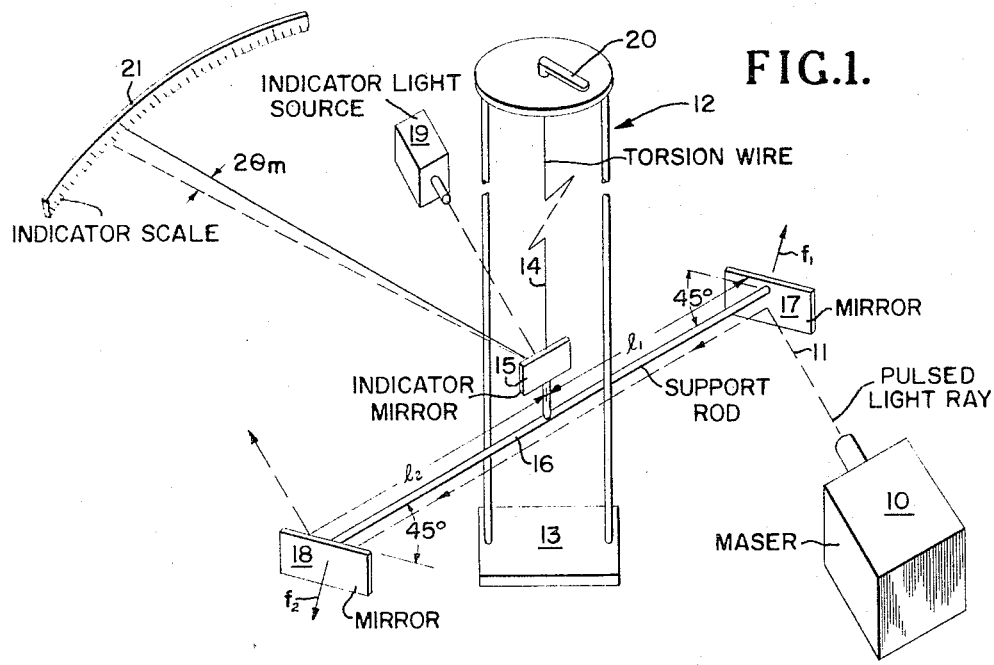
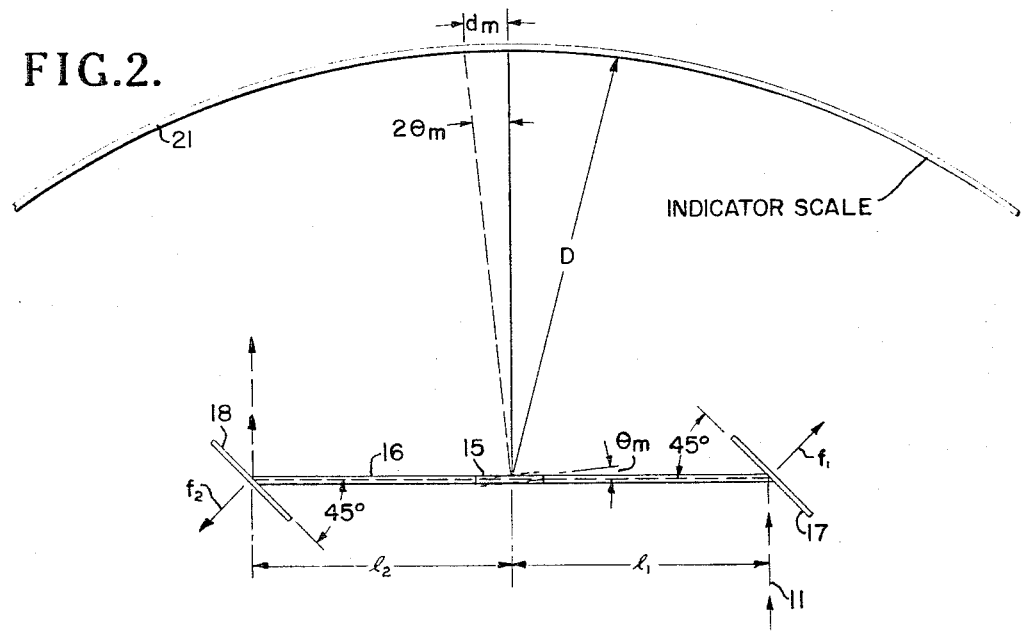
INVENTORS.
RODNEY E. GRANTHAM
MORTON STIMLER 3,302,521
INSTRUMENT FOR MEASURING ENERGY IN A
LIGHT PULSE
Rodney E. Grantham, Bethesda, and Morton Stimler, Hyattsville, Md., assignors to the United States of America as represented by the Secretary of the Navy
Filed Feb. 28, 1963, Ser. No. 261,911
4 Claims. (Cl. 88—23)

The present invention relates to an instrument for measuring energy in a light pulse and more particularly to an instrument for measuring energy emitted from a MASER or other pulsed light source utilizing a reflecting system with a ballistic pendulum.

In the field of measurement of light pulse energies, it has been the general practice to employ calorimeter devices to measure light pulse energies. Although such devices have served the purpose, they have not proved satisfactory in the measurement of MASER powers of high orders of magnitude. The calorimeter principle requires that the electromagnetic energy be converted to heat in an absorber (black body) material. But the peak power of MASER systems is so great that known absorber materials are vaporized. Vaporization can be eliminated by diverging the MASER beam to distribute the power over a large absorber area. The problem encountered here is that the calorimeter then becomes very large physically. Also, accuracy cannot be achieved because it is difficult to measure the temperature rise over the large absorber area. Furthermore, calorimeter devices destroy the MASER beam rendering it useless for its intended purpose. MASER powers are also expected to increase by several orders of magnitude thereby enhancing the need for a new method of measuring MASER powers.

The general purpose of this invention is to provide an instrument for measuring the energy in a pulsed light source without destruction of the beam which embraces all the advantages of similarly employed measuring instruments and possesses none of the aforedescribed disadvantages. To attain this, the present invention contemplates the use of an instrument for converting the electromagnetic momentum of a MASER beam to angular momentum of a torsion balance system to give a direct indication of the energy in the beam. A reflecting system is used with a ballistic pendulum to measure the pulsed light energy. The use of a reflecting system makes possible a light operated torsion ballistic pendulum thereby providing an impulse-force couple.

The present invention works on the principle of conservation of momentum by reflection of the Maser beam from a pair of highly reflective surfaces rather than the calorimeter principle of energy absorption used in prior devices. Thus, there is no problem of vaporizing absorber material or of measuring the temperature rise of an absorber. The instrument is capable of handling power levels many orders of magnitude in excess of the presently available MASER powers. Also, less time is required between successive measurements with this instrument than with a calorimeter because with the latter device it is necessary to wait until the absorber material has cooled before another light beam can be measured. Furthermore, the instrument can be placed between the MASER and the object to be illuminated to measure the energy of each pulse without extracting appreciable energy or otherwise destroying the utility of the measured beam.

An object of this invention is to provide a new and improved instrument for measuring the energy in a pulsed electromagnetic wave such as generated by an optical MASER.

Another object is to utilize the radiation pressure of a MASER pulse on a pair of reflecting surfaces to provide a means of measuring the total energy of the pulse without destroying the utility of the pulse.

A further object of the invention is the use of a new and improved reflecting system with a ballistic pendulum to measure pulsed light energy.

Still another object is to provide a reflecting impulse-force couple system to actuate a light operated torsion ballistic pendulum in response to a MASER beam impinging thereon.

Other objects and features of the invention will become apparent to those skilled in the art as the disclosure is made in the following detailed description of a preferred embodiment of the invention as illustrated in the accompanying sheet of drawing in which:

FIG. 1 is a perspective view of the instrument measuring a pulsed beam of light from a MASER; and FIG. 2 is a top plan view of the preferred embodiment of the instrument.

Referring now to the drawing, wherein like reference characters designate like or corresponding parts throughout the several views, there is shown in FIG. 1 a ballistic torsion pendulum generally designated as 12. The torsion pendulum comprises a support stand 13 in which a torsion wire 14 is vertically mounted in the upper portion of the stand. A support rod 16 is suspended from its mid-point and perpendicular to the torsion wire 14. Two parallel reflecting mirrors 17 and 18 are secured to the support rod, one at each end. Each reflecting mirror is composed of a plate of glass coated with metal and inclined at a 45° angle with respect to the support rod as shown in FIGS. 1 and 2. It has been found that a thin sheet of material of high reflectivity and high thermal conductivity should be used, as for example, silver, gold or aluminum to reduce "radiometer" effects. The reflecting surfaces of mirrors 17 and 18 are optically opposed and mutually parallel. An indicator mirror 15 is attached to the support rod 16 and the torsion wire 14 to reflect light from indicator light source 19 on to an indicator scale 21 at a reference point when the support rod is at an initial position of rest. A MASER 10 constitutes the source of pulsed light rays. Pulsed light ray 11 is reflected from the mid-point of mirror 17 at a 90° angle on to the mid-point of mirror 18 and then reflected at a 90° angle on to the object to be illuminated. The path of the light ray projected on mirror 17 is parallel to the path of the light ray reflected from mirror 18 since the mirrors are parallel and the angle of incidence of the light ray of one mirror equals the angle of reflection of the light ray from the other mirror. An adjustment lever 20 is used to adjust the support rod and reflecting mirrors so that the light from the MASER 10 will impinge upon the mirror 17 at a 90° angle with respect to the support rod 16 as shown in the drawing. The ballistic torsion pendulum is preferably enclosed by a cylinder (not shown) and air evacuated from the cylinder in order to reduce "radiometer" effects.

The operation of the measuring instrument will now be described. A pulsed light ray 11 is fired from the MASER 10 and is reflected from mirror 17 on to mirror 18 and then on to the object to be illuminated. The directional change of momentum at mirror 17 caused by the reflection of the pulsed light at 90° from mirror 17 causes an impulsive force $f_1$ to be imparted to mirror 17, which force acts on lever arm $l_2$ to exert a counterclockwise torque on the torsion wire 14. Likewise, the reflection of the pulsed light ray at 90° from mirror 18 causes an impulsive force $f_2$ to be imparted to mirror 18, which force acts on lever arm $l_1$, to exert another counterclockwise torque on the torsion wire 14. Therefore, it can be seen that a force couple acting in a counter clockwise direction results. This couple is equal to the torque resulting from the same beam if a single mirror were in line with the support arm and there was normal incidence of the beam with the reflecting surface thereof. As the torsion wire is twisted in a counterclockwise direction, the light rays from the indicator light source are reflected by the indicator mirror to a new position on the indicator scale (the light rays having been focused on a reference point before the pulsed light ray was fired). Thus, the indicator light rays move through an angle $2\theta_m$, which angle is proportional to the energy of the pulsed light ray. After computing the angle $\theta_m$ (as hereafter described) and substituting its value in the basic equation of the instrument, the energy of the pulsed light ray can be measured.

The basic equation of the instrument for the case of normal incidence of a light beam on a single reflecting mirror is derived as follows:

To find the theoretically expected deflection, let V be the energy in an incident MASER beam and $c$ be the velocity of light. The momentum $p_1$ of the incident beam will be:

(1) $$p_1 = \frac{V}{c}$$

If it is assumed that the reflectivity of mirrors 17 and 18 is 1, and the reflecting mirrors are stationary during the duration of the MASER pulse (several microseconds) then by the Law of Conservation of Angular Momentum (2) $$pR = -pR + Iw_0$$

where,

R is the radius of gyration of the pendulum.
I is the moment of inertia of the pendulum.
$w_0$ is the initial angular velocity of the pendulum.

The reflected angular momentum about the axis of the torsion wire is represented by $-pR$. The initial angular momentum of the suspension system is represented by $Iw_0$.

Substituting equation (1) in equation (2) results in, (3) $$Iw_0 = \frac{2VR}{c}$$

Since the initial kinetic energy of the pendulum becomes the potential energy of the torsion wire, K.E.=P.E.

(4) $$\frac{1}{2}Iw_0^2 = \frac{1}{2}K\theta_m^2$$

where,

K is the spring constant of the torsion wire.
$\theta_m$ is the maximum angular deflection of the pendulum after the impulse.

Solving equations (3) and (4) for V (5) $$V = \frac{C\theta_m\sqrt{IK}}{2R}$$

The angle $\theta_m$ can be ascertained since for small angles, (6) $$2\theta_m = \frac{d_m}{D}$$

where, $d_m$ is the maximum linear deflection on the indicator scale.
D is the distance of the indicator mirror from the indicator scale.

Therefore, the energy V in a light ray pulse can be computed from equation (5) since the values of $\theta_m$, $c$, I, K and R can be ascertained.

The measurements obtained from the instrument have been found to approach the actual energy of the beam within an error of 5%. Thus, it can be seen that an instrument for accurately measuring the energy in a light pulse has been devised. The radiation pressure of the MASER pulse on two reflecting surfaces is measured and hence the total energy of the pulse. A torsion ballistic pendulum equipped with two mirrors which cause a directional momentum change of the light pulse and a consequent ballistic impulse to be imparted as a force couple to the torsion pendulum has thus been effected. The maximum angular deflection of the pendulum is proportional to the energy of the light pulse.

Whereas the device has been described which reference to the measurement of the energy of a light beam, it is not so limited, as it may also be employed for measuring the momentum, radiation pressure or number of photons of the beam, if desired.

Obviously many modifications and variations of the present invention are possible in the light of the above teachings. It is therefore to be understood, that within the scope of the appended claims, the invention may be practiced otherwise than as specifically described.

Having thus described the invention, what is claimed is:

1. A device for measuring the energy of a light beam emitted from an optical MASER which comprises a torsion ballistic pendulum having a rotatable rod, a pair of mirrors each respectively secured to opposite ends of said rod with the reflecting surfaces thereof in mutual parallel and facing relation such that the reflecting surfaces are disposed at an angle of 45° with respect to the axis of the rod, means including a torsion wire connected to the rod at the mid-point thereof supporting the rod in a horizontal position for rotative movement about said mid-point from an initial position of rest, a reflecting mirror secured to said wire and rotatable rod, means for projecting a beam of light on said mirror at an oblique angle with respect to the surface thereof, an indicating scale traversed by the reflected beam of light from said light projecting means variably in accordance with the degree of rotative movement of said rod from said initial position of rest, and means including an optical MASER positioned to suddenly project a high intensity light beam momentarily on one of said pair of mirrors in a direction to cause the beam reflected therefrom to impinge upon the second mirror of said pair and impart a ballistic impulse to said rod sufficient to move the rod about the axis of said wire from an initial position of rest.

2. In an instrument for measuring the energy of a light pulse:

a ballistic torsional pendulum having a torsion wire vertically mounted on a support stand by one end thereof, with the other end being freely suspended;

a support rod having the free end of said torsion wire connected to the midpoint thereof, whereby said rod is suspended in a horizontal position;

two optically opposed light reflecting surfaces facing in opposite directions and secured respectively in parallel relationship at opposite ends of said support rod at a 45° angle with respect to the axis of said support rod;

indicator means connected between the free end of said torsion wire and the midpoint of said support rod for effecting an indication of the degree of torsional movement of said vertically mounted torsion wire; and an optical MASER positioned to project a high intensity light pulse on one of said reflecting surfaces, said one of said reflecting surfaces being positioned so as to cause the beam reflected therefrom to impinge upon the other reflecting surface to thereby impart a torsional force couple to said pendulum.

3. A measuring instrument as recited in claim 2 wherein the indicator means comprises:

an indicator mirror connnected between the free end of the torsion wire and the midpoint of the support rod whereby a light beam from an indicator light source will be reflected from said indicator mirror onto an indicator scale for measuring the degree of torsional movement of said pendulum upon the impingement of a light pulse from the optical MASER on the reflecting surfaces.

4. A measuring instrument as recited in claim 3 further comprising adjustment means cooperating with said torsion wire to adjust the support rod and reflecting surfaces such that the light pulse from the MASER will impinge upon one of the reflectors at a 90° angle with respect to the axis of the support rod when the rod is in an initial position of rest.

References Cited by the Examiner

UNITED STATES PATENTS

| | | | |
|---|---|---|---|
| 454,719 | 6/1891 | Deshler | 88—23 |
| 1,000,831 | 8/1911 | Martin | 88—23 |
| 1,960,891 | 5/1934 | Blau | 88—74 X |
| 1,968,859 | 8/1934 | Smith | 88—14 X |

FOREIGN PATENTS

| | | |
|---|---|---|
| 817,177 | 10/1951 | Germany. |
| 3,860 | 11/1875 | Great Britain. |

OTHER REFERENCES

Cook et al., "Measurement of Laser Output by Light Pressure," Proceedings of the IRE, July 1962, p. 1693.

JEWELL H. PEDERSEN, *Primary Examiner.*

J. L. CHASKIN, W. L. SIKES, *Assistant Examiners.*